(12) United States Patent
Fukaya

(10) Patent No.: US 10,113,440 B2
(45) Date of Patent: Oct. 30, 2018

(54) THERMOACOUSTIC ELECTRIC GENERATOR SYSTEM

(71) Applicant: CENTRAL MOTOR WHEEL CO., LTD., Anjo-shi, Aichi (JP)

(72) Inventor: Noriyuki Fukaya, Miyoshi (JP)

(73) Assignee: CENTRAL MOTOR WHEEL CO., LTD., Anjo (JP)

(*) Notice: Subject to any disclaimer, the term of this patent is extended or adjusted under 35 U.S.C. 154(b) by 0 days.

(21) Appl. No.: 15/564,657

(22) PCT Filed: Mar. 22, 2016

(86) PCT No.: PCT/JP2016/058903
§ 371 (c)(1),
(2) Date: Oct. 5, 2017

(87) PCT Pub. No.: WO2016/185783
PCT Pub. Date: Nov. 24, 2016

(65) Prior Publication Data
US 2018/0073383 A1    Mar. 15, 2018

(30) Foreign Application Priority Data
May 21, 2015   (JP) .................................. 2015-103522

(51) Int. Cl.
*F01D 15/10*    (2006.01)
*H02K 7/18*    (2006.01)
(Continued)

(52) U.S. Cl.
CPC ............... *F01D 15/10* (2013.01); *F01D 1/04* (2013.01); *F02C 1/10* (2013.01); *F02C 6/00* (2013.01);
(Continued)

(58) Field of Classification Search
USPC .............................. 290/1 R, 52; 60/520; 62/6
See application file for complete search history.

(56) References Cited

U.S. PATENT DOCUMENTS

| 4,114,380 A | * | 9/1978 | Ceperley | ............... F02G 1/0435 60/721 |
| 4,355,517 A | * | 10/1982 | Ceperley | ................. F02G 1/043 60/517 |

(Continued)

FOREIGN PATENT DOCUMENTS

| JP | 2011-122765 A | 6/2011 |
| JP | 2014-234949 A | 12/2014 |
| WO | 2013/084830 A1 | 6/2013 |

*Primary Examiner* — Pedro J Cuevas
(74) *Attorney, Agent, or Firm* — Oliff PLC

(57) ABSTRACT

A thermoacoustic electric generator system includes: a thermoacoustic engine provided in an annular tube; a turbine provided in a branched tube and rotating when receiving acoustic energy, which is generated by thermoacoustic oscillation of working gas in the thermoacoustic engine; and a generator for converting kinetic energy, which is generated by rotation of the turbine, to electric energy. The turbine is provided at a specified position that belongs to a region between a first position and a second position in each region of the branched tube, the first position being an intermediate position between one end and the other end, and the second position being an intermediate position between the first position and the other end.

2 Claims, 6 Drawing Sheets

(51) Int. Cl.
*F03B 13/00* (2006.01)
*F01D 1/04* (2006.01)
*F03G 7/00* (2006.01)
*F02G 1/04* (2006.01)
*F02C 1/10* (2006.01)
*F02C 6/00* (2006.01)

(52) U.S. Cl.
CPC ............... *F02G 1/04* (2013.01); *F03G 7/00* (2013.01); *H02K 7/1823* (2013.01)

(56) References Cited

U.S. PATENT DOCUMENTS

| | | | | |
|---|---|---|---|---|
| 4,953,366 A * | 9/1990 | Swift | | F25B 9/145 60/721 |
| 5,901,556 A * | 5/1999 | Hofler | | F03G 7/002 62/467 |
| 6,021,643 A * | 2/2000 | Swift | | F25B 9/145 62/6 |
| 6,032,464 A * | 3/2000 | Swift | | F02G 1/02 60/520 |
| 6,314,740 B1 * | 11/2001 | De Blok | | F02G 1/043 62/467 |
| 6,560,970 B1 * | 5/2003 | Swift | | F25B 9/14 60/520 |
| 6,637,211 B1 * | 10/2003 | Swift | | F25B 9/145 60/520 |
| 6,644,028 B1 * | 11/2003 | Swift | | F25B 9/14 60/516 |
| 6,658,862 B2 * | 12/2003 | Swift | | F02G 1/0435 62/6 |
| 6,732,515 B1 * | 5/2004 | Weiland | | F02G 1/0435 60/520 |
| 7,081,699 B2 * | 7/2006 | Keolian | | H01L 41/113 310/306 |
| 7,104,055 B2 * | 9/2006 | Matsubara | | F25B 9/14 60/516 |
| 7,908,856 B2 * | 3/2011 | Backhaus | | F02G 1/0435 310/306 |
| 8,181,460 B2 * | 5/2012 | McQuary | | F25B 9/14 60/516 |
| 8,203,224 B2 * | 6/2012 | Schulte | | H02N 11/008 102/200 |
| 8,205,459 B2 * | 6/2012 | Garner | | F25B 9/145 62/6 |
| 8,227,928 B2 * | 7/2012 | Garner | | F02G 1/043 290/1 R |
| 8,375,729 B2 * | 2/2013 | Schwartz | | F25B 9/145 62/215 |
| 8,499,563 B2 * | 8/2013 | Asturias | | F03G 7/05 310/311 |
| 8,508,057 B2 * | 8/2013 | Schulte | | H02N 11/008 102/200 |
| 8,584,471 B2 * | 11/2013 | Schwartz | | F25B 9/145 62/467 |
| 8,806,875 B2 * | 8/2014 | Watanabe | | F25B 9/145 62/6 |
| 8,938,963 B2 * | 1/2015 | Yamamoto | | F02G 1/04 60/517 |
| 9,163,581 B2 * | 10/2015 | Dyson, Jr. | | F02G 1/04 |
| 9,562,522 B2 * | 2/2017 | Agnon | | F03G 7/002 |
| 9,664,181 B2 * | 5/2017 | Steiner | | F03G 7/002 |
| 9,759,157 B2 * | 9/2017 | Miyairi | | F02G 1/043 |
| 9,777,951 B2 * | 10/2017 | Hasegawa | | F25B 9/145 |
| 9,869,303 B2 * | 1/2018 | Miyairi | | F03G 7/00 |
| 2003/0188541 A1 * | 10/2003 | Howard | | F02G 1/0435 62/6 |
| 2003/0192324 A1 * | 10/2003 | Smith | | F02G 1/0435 62/6 |
| 2005/0067005 A1 * | 3/2005 | Van Der Spek | | E21B 28/00 136/205 |
| 2008/0060364 A1 * | 3/2008 | Watanabe | | F25B 9/145 62/6 |
| 2010/0212311 A1 * | 8/2010 | McQuary | | F25B 9/14 60/520 |
| 2011/0121583 A1 * | 5/2011 | Asturias | | F03G 7/05 290/1 R |
| 2012/0230848 A1 * | 9/2012 | McQuary | | F25B 9/14 417/383 |
| 2014/0338369 A1 | 11/2014 | Hasegawa et al. | | |
| 2018/0073780 A1 * | 3/2018 | Fukaya | | F01D 1/04 |

* cited by examiner

THERMOACOUSTIC ELECTRIC GENERATOR SYSTEM

TECHNICAL FIELD

The invention relates to a thermoacoustic electric generator system for generating electric energy using a thermoacoustic engine that induces thermoacoustic oscillation of working gas.

BACKGROUND ART

Conventionally, efficient energy use has been promoted in various industrial fields. However, a rate of exhaust heat, which is exhausted and wasted from facilities such as factories and vehicles, for example, still remains high. Thus, a technique of efficiently collecting thermal energy has been desired. In the earnest investigation into this technique, the present inventor has focused his attention on use of a thermoacoustic engine capable of inducing thermoacoustic oscillation of working gas. One example of a system (hereinafter also referred to as a "thermoacoustic electric generator system") that generates electric energy using this thermoacoustic engine has been disclosed in PCT/JP/2012-081193.

The thermoacoustic engine used in this thermoacoustic electric generator system includes: a stack configured by including plural channels; a hot heat exchanger provided at one end of each of the channels in the stack; and a cold heat exchanger provided at the other end of each of the channels in the stack. This thermoacoustic engine induces thermoacoustic oscillation of working gas, which is enclosed in a tube, through generation of a temperature gradient between both of the ends of the channel in the stack, and thus can generate acoustic energy. Furthermore, this thermoacoustic electric generator system is configured to include a linear generator in a branched tube, which is branched from an annular tube, drive this generator using the acoustic energy generated in the thermoacoustic engine, and thereby generate electric energy.

SUMMARY OF THE INVENTION

As described above, the linear generator is used to generate the electric energy using the thermoacoustic oscillation of the working gas, which is generated in the thermoacoustic engine. However, use of the linear generator is disadvantageous in terms of cost because this linear generator itself is expensive. Thus, the present inventor performed the earnest investigation into a technique of arranging a turbine in a branched tube and using a turbine-type generator that generates the electric energy using kinetic energy during actuation of this turbine. As a result of the investigation, it was successfully found out that mere provision of the turbine in the branched tube did not always allow driving of the generator and that, in order to reliably drive the generator, an installment position of the turbine in the branched tube was extremely important.

The invention has been made in view of the above points, and one of purposes of the invention is to provide an effective technique of reliably driving a turbine-type generator in a thermoacoustic electric generator system that generates electric energy using thermoacoustic oscillation of working gas generated in a thermoacoustic engine.

In order to achieve the above purpose, a thermoacoustic electric generator system (100) according to the invention includes a tube component (101), a thermoacoustic engine (110), a turbine (140), and a generator (150). The tube component (101) includes: an annular tube (102) configured to be annular; and a branched tube (103) branched from the annular tube (102), extending lengthwise from one end (103a), which is located at a branched point from the annular tube (102), to the other end (103b), and communicating with the annular tube (102), and specified working gas is enclosed in both of the annular tube (102) and the branched tube (103). The thermoacoustic engine (110) includes: a stack (111) incorporated in an inside of the annular tube (102) in the tube component (101) and having plural channels (111c), each of which extends in a tube longitudinal direction; and heat exchangers (112, 113) exchanging heat with the working gas such that a temperature gradient is generated between both ends of each of the plural channels (111c) in the stack (111), so as to cause thermoacoustic oscillation of the working gas. The turbine (140) is provided in the branched tube (103) of the tube component (101) and rotates when receiving a sound wave, which is generated by the thermoacoustic oscillation of the working gas in the thermoacoustic engines (110). A generator (150) fulfills a function of converting kinetic energy generated by rotation of the turbine (140) to electric energy. The turbine (140) is provided at a specified position that belongs to a region between a first position (P3) and a second position (P4) in each region of the branched tube (103) in the tube component (101), the first position (P3) being an intermediate position between the one end (103a) and the other end (103b), and the second position (P4) being an intermediate position between the first position (P3) and the other end (103b).

In regard to the thermoacoustic electric generator system of this configuration, according to the examination by the present inventor, it has been found out that the region in the branched tube of the tube component is effective in the continuous and reliable rotation of the turbine as being a region where flow velocity amplitude of the working gas (displacement per unit time of the working gas in the tube longitudinal direction) is relatively large, and realizes favorable energy efficiency as being a region where a vibration starting temperature of the thermoacoustic engine (a temperature at which the thermoacoustic oscillation of the working gas actually starts being induced) is relatively low. Accordingly, when the turbine is installed at the specified position belonging to the region, the generator can reliably be driven to generate the electric energy, and an energy efficient state can be realized in terms of the generation of the electric energy.

In the thermoacoustic electric generator system (100) of the above configuration, at the other end (103b), the branched tube (103) of the tube component (101) preferably includes an energy extraction section (160) for extracting the acoustic energy, which is generated by the thermoacoustic oscillation of the working gas, to an outside thereof, and the energy extraction section (160) is preferably constructed of a speaker-type generator or a linear generator capable of outputting electrical energy when receiving pressure vibration in a tube longitudinal direction of the branched tube (103).

In the thermoacoustic electric generator system of this configuration, according to the examination by the present inventor, it has been found out that the other end of the branched tube in the tube component is a position at which pressure amplitude (a magnitude of a pressure fluctuation, that is, fluctuation width between a maximum value and a minimum value of the pressure) of the working gas becomes the largest in each of the regions of the branched tube and is an appropriate position for driving of the speaker-type generator or the linear generator. Accordingly, when the generator that is the speaker-type generator or the linear generator is provided at the other end of the branched tube, the acoustic energy, which cannot be fully collected by a turbine-type generator can be collected as the electrical energy.

Note that, in the above description, in order to facilitate understanding of the invention, components of the invention that correspond to those of the embodiment are denoted by the reference signs used in the embodiment in parentheses. However, each of the components of the invention is not limited to that in the embodiment defined by the reference sign.

As it has been described so far, according to the invention, the turbine-type generator can reliably be driven in the thermoacoustic electric generator system that generates the electric energy using the thermoacoustic oscillation of the working gas generated in the thermoacoustic engine.

MODES FOR CARRYING OUT THE INVENTION

A detailed description will hereinafter be made on one embodiment of the invention with reference to the drawings. Note that, in said drawings, in regard to each component of the same element that is denoted by the same reference sign for the description, a reference sign thereof for the description is omitted when necessary.

Figure 1:
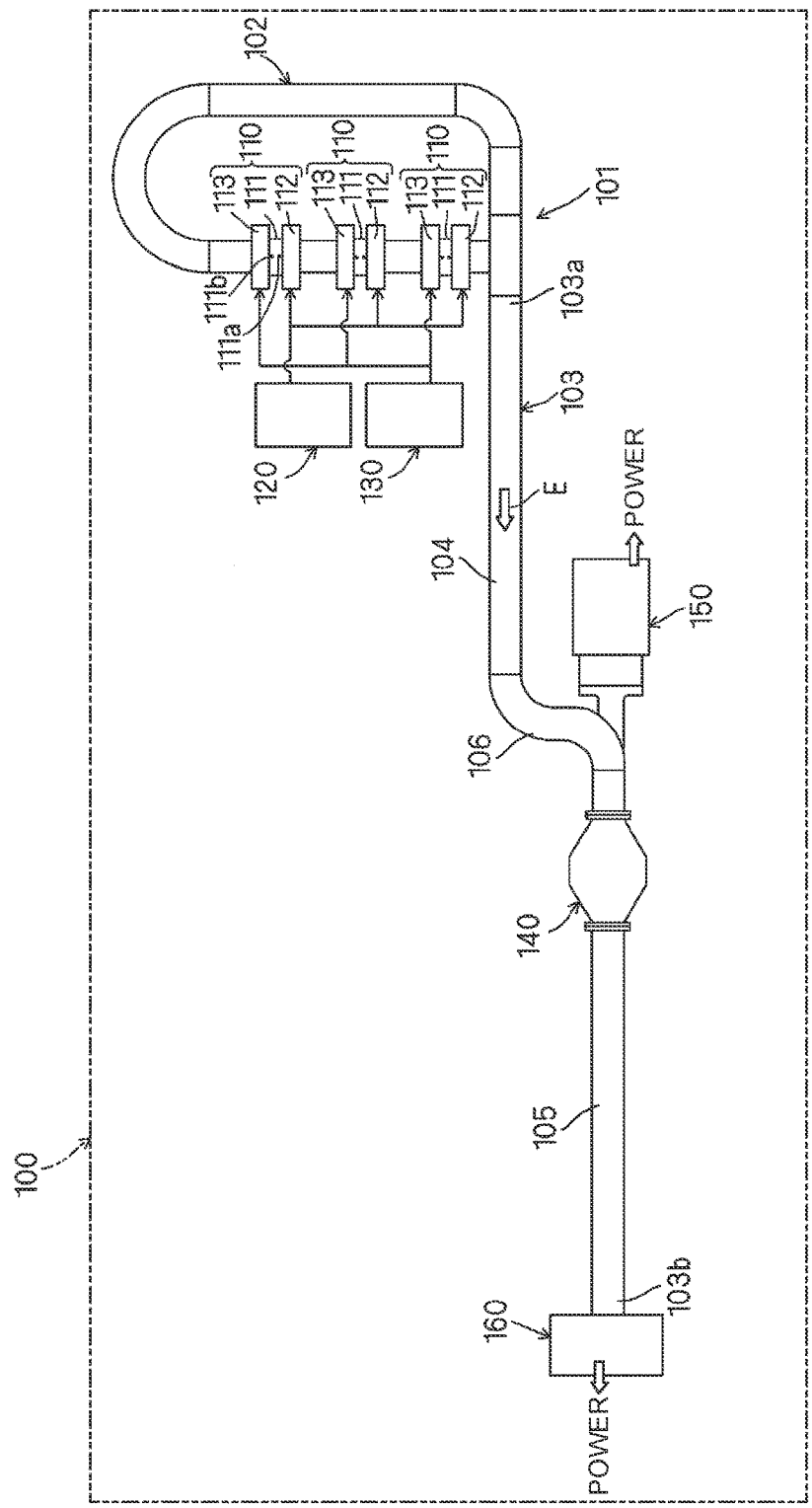
FIG. 1 is a schematic view of an overview of a thermoacoustic electric generator system according to the invention.

As shown in FIG. 1, a thermoacoustic electric generator system 100 includes a tube component 101 that is configured by including metallic tubes. This tube component 101 is configured by including: an annular tube 102 as an annular (loop) tube portion; and a branched tube 103 that is branched from the annular tube 102 and, an internal space of which communicates with an internal space of the annular tube 102. This tube component 101 corresponds to the "tube component" of the invention. In addition, the annular tube 102 and the branched tube 103 respectively correspond to the "annular tube" and the "branched tube" of the invention. Note that the annular tube 102 of the tube component 101 only needs to be annular, and any of various shapes such as a circle, an oval, and a polygon can be adopted as a shape thereof in a side view.

The branched tube 103 has one end 103a as a branched point that is branched from the annular tube 102, and is a tube portion that extends lengthwise from this one end 103a to the other end 103b. The branched tube 103 is closed at the other end 103b by an energy extraction section 160, and specified working gas (helium in this embodiment) is thereby enclosed under a specified pressure in both of the annular tube 102 and the branched tube 103. Note that, instead of or in addition to helium, nitrogen, argon, mixed gas of helium and argon, air, or the like can be used as the working gas.

The annular tube 102 of the tube component 101 is provided with three thermoacoustic engines (also referred to as "motors") 110 that are connected in series. These three thermoacoustic engines 110 constitute a so-called "multi-stage thermoacoustic engine". Each of the thermoacoustic engines 110 includes: a stack 111 incorporated in an inside of the annular tube 102; a hot heat exchanger 112 arranged to oppose one end 111a as a high-temperature section of the stack 111; and a cold heat exchanger 113 arranged to oppose the other end 111b as a normal-temperature section (or a low-temperature section) of the stack 111. The thermoacoustic engine 110 herein corresponds to the "thermoacoustic engine" of the invention. Note that the number of installment of this thermoacoustic engine 110 is not limited to three, and another number of the installment can be selected when necessary.

Figure 2:
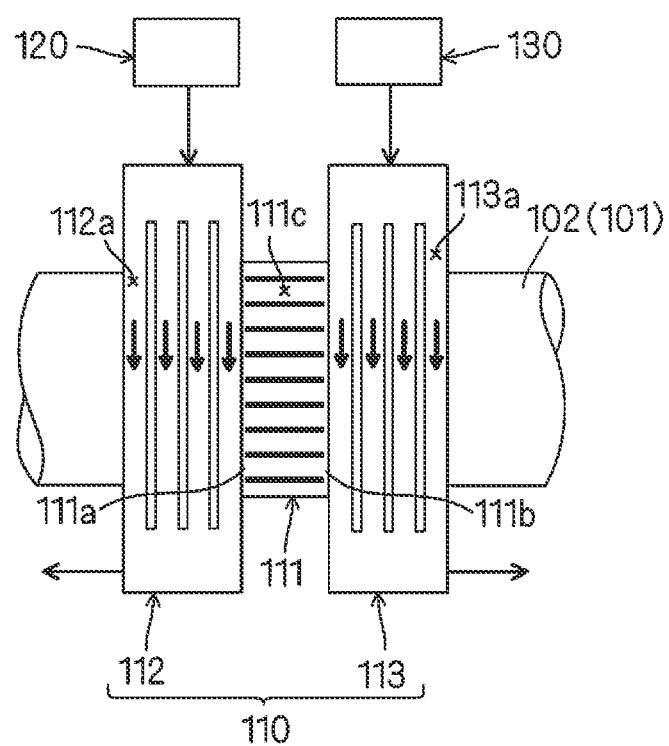
FIG. 2 is a schematic view of a structure of a thermoacoustic engine in the thermoacoustic electric generator system in FIG. 1.

As shown in FIG. 2, each of the stack 111 is configured as a structure having plural channels 111c that extend in parallel with each other from the one end 111a to the other end 111b along a tube longitudinal direction (a tube extending direction) of the annular tube 102. When a specified temperature gradient is generated between the one end 111a and the other end 111b of this stack 111, the working gas in the annular tube 102 becomes unstable to induce thermoacoustic oscillation thereof. In this way, oscillatory waves (also referred to as "sound waves", a "vibration flow", or a "work flow") are produced by vertical waves that vibrate in parallel with an advancing direction of the working gas, and such oscillatory waves transfer from the inside of the annular tube 102 to an inside of the branched tube 103. As this stack 111, a honeycomb structure made of ceramics, a structure in which thin mesh sheets made of stainless steel are stacked in parallel at fine pitches, a nonwoven fabric-like material made of metallic fiber, or the like can typically be used. This stack 111 corresponds to the "stack" of the invention.

Each of the hot heat exchangers 112 is connected to a heating source 120. The heating source 120 fulfills a function of supplying a heating medium such as hot air or hot water to each of the hot heat exchangers 112. Each of the hot heat exchangers 112 is configured as a heat exchanger for heating that includes: a passage 112a, through which the relatively high-temperature heating medium flows; and a passage (not shown), through which the relatively low-temperature working gas flows, and that can move heat from the heating medium to the working gas through heat exchange between the heating medium and the working gas. In this way, the working gas situated around the one end 111a of each of the stack 111 is heated by the heating medium supplied from the heating source 120 to each of the hot heat exchangers 112.

Each of the cold heat exchangers 113 is connected to a cooling source 130. The cooling source 130 fulfills a function of supplying a cooling medium such as cold wind, cold water, or atmospheric air to each of the cold heat exchangers 113. Each of the cold heat exchangers 113 is configured as a heat exchanger for cooling that includes: a passage 113a, through which the relatively low-temperature cooling medium flows; and a passage (not shown), through which the relatively high-temperature working gas flows, and that can move the heat from the working gas to the cooling medium through the heat exchange between the working gas and the cooling medium. In this way, the working gas situated around the other end 111b of each of the stack 111 is cooled by the cooling medium supplied from the cooling source 130 to each of the cold heat exchangers 113.

The specified temperature gradient is generated between the one end 111a and the other end 111b of each of the stack 111 through cooperation of a heating effect by the above hot heat exchanger 112 and a cooling effect by the above cold heat exchanger 113. The hot heat exchanger 112 and the cold heat exchanger 113 described above serve as the heat exchanger that exchanges the heat with the working gas such that the temperature gradient is generated between both ends of each of the plural channels 111c in each of the stack 111 in order to induce the thermoacoustic oscillation of the working gas enclosed in the tube component 101. These hot heat exchanger 112 and cold heat exchanger 113 constitute the "heat exchanger" of the invention.

Returning to FIG. 1, the branched tube 103 includes: a first tube section 104 that extends linearly between the annular tube 102 and a turbine 140; a second tube section 105 that extends linearly on an opposite side of the turbine 140 from the annular tube 102; and a crank tube section 106 that is bent in a crank shape to couple the first tube section 104 and the second tube section 105.

Although details will be described below, the turbine 140 is configured to communicate with the inside of the branched tube 103 and fulfills a function to convert acoustic energy (also referred to as "vibration energy"), which is generated by the oscillatory waves of the working gas flowing through the branched tube 103, to mechanical rotational energy. That is, this turbine 140 is provided in the branched tube 103 and rotates when receiving the acoustic energy, which is generated by the thermoacoustic oscillation of the working gas in the thermoacoustic engines 110. A generator 150 that converts kinetic energy (the rotational energy) by the rotation of this turbine 140 to electric energy is connected to the turbine 140. The turbine 140 and the generator 150 herein respectively correspond to the "turbine" and the "generator" of the invention. These turbine 140 and generator 150 constitute a turbine-type generator that is driven by the turbine to generate the electric energy.

The other end 103b of the branched tube 103, that is, a tube end on an opposite side from the turbine 140 of tube ends on both sides of the second tube section 105 is provided with the energy extraction section 160 that extracts the acoustic energy of the working gas from the branched tube 103 to an outside of the tube. This energy extraction section 160 corresponds to the "energy extraction section" of the invention. In this embodiment, as this energy extraction section 160, a speaker-type generator capable of receiving pressure vibrations in the tube longitudinal direction of the branched tube 103 and outputting electrical energy (the electric energy) is used. This speaker-type generator uses a reverse phenomenon of a normal speaker that converts the electrical energy to vibrations of air or the like, and is configured to output the electrical energy by receiving a vibration flow of the working gas.

Figure 3:
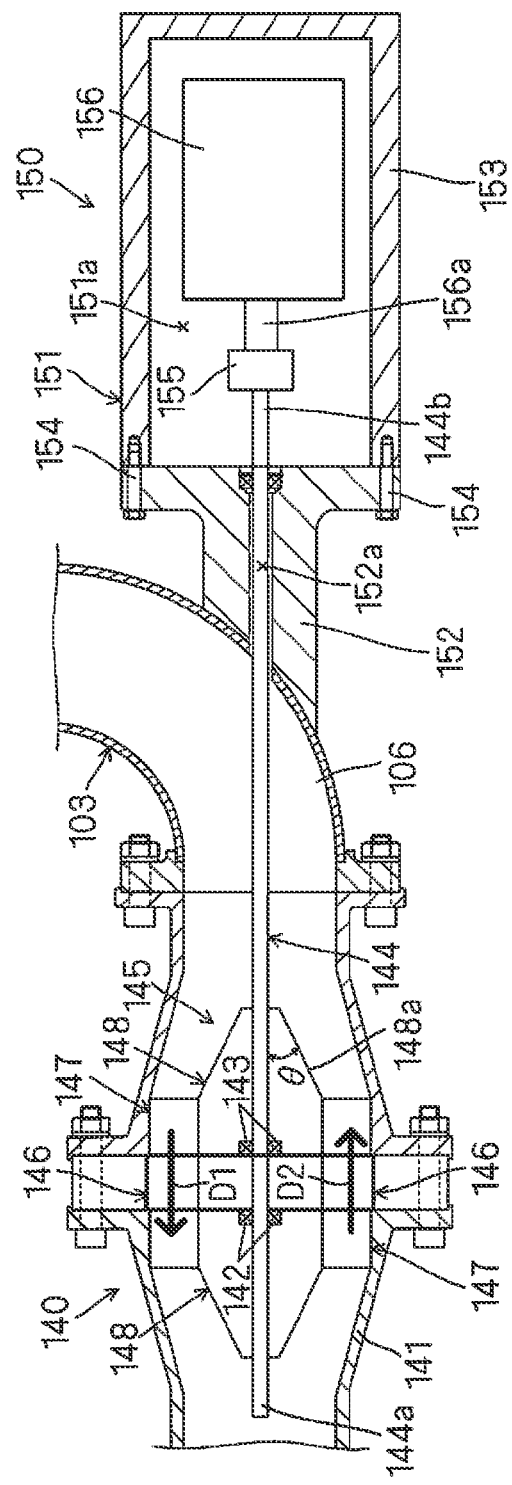
FIG. 3 is a view of a cross-sectional structure of a portion of a turbine generator in the thermoacoustic electric generator system in FIG. 1.

As shown in FIG. 3, the turbine 140, which constitutes the turbine generator, includes a turbine housing 141, a turbine rotational shaft 144, and a turbine blade 145. The turbine housing 141 is a portion that accommodates a part of the turbine rotational shaft 144 and the turbine blade 145 and that constitutes a part of the branched tube 103, and communicates with both of the second tube section 105 and the crank tube section 106 in the branched tube 103. The turbine rotational shaft 144 is configured as a cylindrical member that is supported via bearings 142, 143 in a manner capable of rotating axially. This turbine rotational shaft 144 extends lengthwise in the tube longitudinal direction from one end 144a, which is located in the turbine housing 141, that is, in the branched tube 103, to the other end 144b by penetrating a tube wall of the crank tube section 106 from the inside to the outside of the branched tube 103. This turbine rotational shaft 144 is coupled to the turbine blade 145 and serves as a rotation center of this turbine blade 145.

The turbine blade 145 is provided in the branched tube 103 (the crank tube section 106), receives the acoustic energy generated by the thermoacoustic oscillation of the working gas in the thermoacoustic engines 110, and rotates by an effect of an impulsive force thereof. This turbine blade 145 includes: a toric rotor blade section 146 fixed to the turbine rotational shaft 144; toric fixed blade sections 147 that interpose the rotor blade section 146 therebetween and are arranged on both sides thereof; and a cone section 148 provided on an opposite side of each of the fixed blade sections 147 from the rotor blade section 146. This turbine blade 145 is configured as a rotary vane including the rotor blade section 146 that integrally rotates with the turbine rotational shaft 144. Accordingly, the turbine 140, which has the turbine blade 145, is also referred to as an "impulsive turbine".

Figure 4:
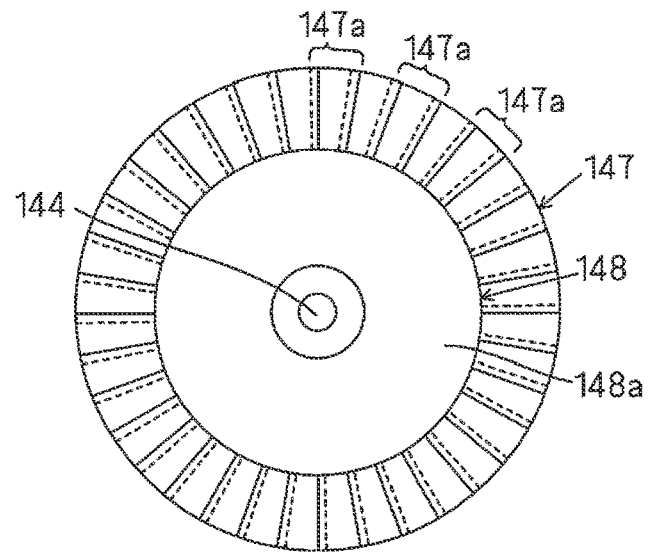
FIG. 4 is a view of a turbine blade that is seen in a cross-sectional direction.

The fixed blade section 147 does not rotate even when the rotor blade section 146 rotates. As shown in FIG. 4, in this fixed blade section 147, plural blades 147a that extend in a radial direction are arranged at constant intervals in a circumferential direction, and a circulation space, in which the working gas can circulate, is formed between two each of these plural blades 147a.

With reference to FIG. 3 and FIG. 4, the cone section 148 has a conical shape, an outer diameter of which is gradually reduced as separating from the corresponding fixed blade section 147, an outer surface thereof constitutes an inclined surface 148a that is inclined to an axis of the turbine rotational shaft 144. The inclined surface 148a of the cone section 148 fulfills a function of smoothly introducing the oscillatory wave of the working gas toward the fixed blade section 147. According to this cone section 148, the oscillatory wave of the working gas can be introduced into the fixed blade section 147 at a specified entry angle θ (an acute angle defined by the inclined surface 148a, which is inclined along the outer surface of the cone section 148, and the axis of the turbine rotational shaft 144).

Figure 5:
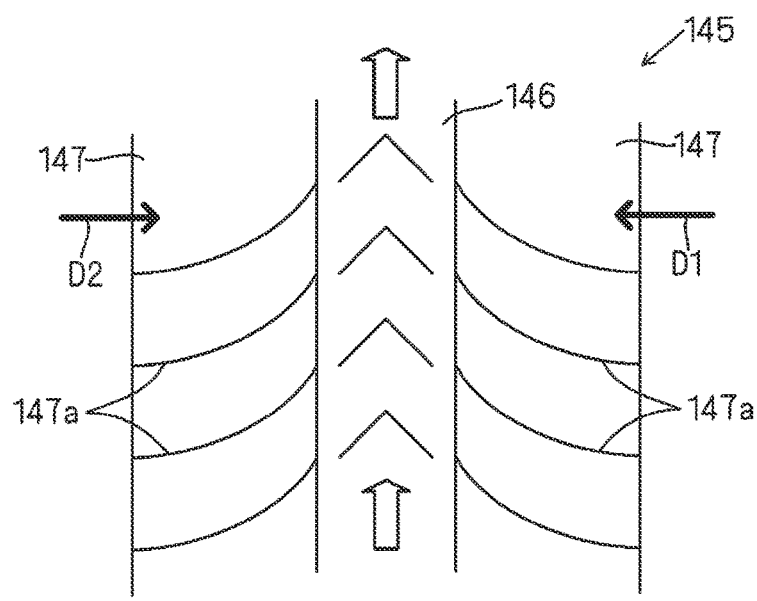
FIG. 5 is a schematic view of a structure of the turbine blade.

The turbine blade 145 configured as above is a so-called "bidirectional turbine blade" and, as shown in FIG. 5, is configured that, in either of cases where the working gas flows in a first direction indicated by an arrow D1 and the working gas flows in a second direction (a reverse direction of the first direction) indicated by an arrow D2, the working gas flows into the rotor blade section 146 through the circulation space of the fixed blade section 147 and that the rotor blade section 146 thereby rotates in the specified one direction.

Returning to FIG. 3, the generator 150, which constitutes the turbine generator, is provided on the outside of the branched tube 103 in the tube component 101, is coupled to the turbine rotational shaft 144 of the turbine 140, and fulfills a function of converting the rotational energy of the turbine blade 145 to the electric energy. This generator 150 includes a generator housing 151. This generator housing 151 includes: a first housing section 152 that is joined to the crank tube section 106 by welding; and a second housing section 153 that is attached to the first housing section 152 via a bolt member 154.

In this generator housing 151, when the second housing section 153 is attached to the first housing section 152, an accommodation space 151a for accommodating an electric motor 156 as a component of the generator 150 in an airtight state is formed. The first housing section 152 is provided with a communication hole 152a for communicating the accommodation space 151a with the inside of the crank tube section 106 in the branched tube 103.

In the turbine 140, a portion of the turbine rotational shaft 144 that is located on the outside of the branched tube 103 is introduced into the accommodation space 151a through the communication hole 152a of the generator housing 151, and the other end 144b is coupled to a motor shaft 154a of the electric motor 156 by a coupling section 155. That is, the turbine blade 145 of the turbine 140 is coupled to the generator 150 via the turbine rotational shaft 144. According to this generator 150, in the case where the turbine rotational shaft 144 rotates axially due to mechanical rotary motion of the turbine 140, a motor shaft 154a rotates due to the rotary motion of this turbine rotational shaft 144, and the electric motor 156 thereby generates electricity. In this case, the electric motor 156 fulfills a function as a substantial generator.

While a part of the turbine rotational shaft 144 in the turbine 140 extends from the inside to the outside of the branched tube 103, the extended portion is accommodated in a tightly sealed state in the accommodation space 151a of the generator housing 151. As a result, the entire turbine rotational shaft 144 is placed in a tightly sealed region from the inside of the branched tube 103 to the accommodation space 151a of the generator housing 151. Accordingly, a dedicated shaft seal structure to the turbine rotational shaft 144 does not have to be provided, and thus a structure related to the turbine rotational shaft 144 can be simplified.

The above coupling section 155 can easily detach the generator 150 from the turbine 140 when necessary by canceling coupling between the other end 144b of the turbine rotational shaft 144 and a motor shaft 156a of the electric motor 156. As described above, in the turbine 140 of this embodiment, the turbine rotational shaft 144 extends from the inside to the outside of the branched tube 103. In this way, in a state of being arranged on the outside of the branched tube 103, the generator 150 can be coupled to the other end 144b of the turbine rotational shaft 144. In this case, as a result of facilitated detachment of the generator 150 from the turbine 140, maintainability of the generator 150 is improved. In addition, according to the above coupling section 155, the other end 144b of the turbine rotational shaft 144 is coupled to a motor shaft of another motor instead of the electric motor 156. Thus, the electric motor (the generator) that is coupled to the turbine 140 can be replaced with an optimum motor in accordance with capacity and the like of the turbine 140. In this way, electric energy generation capacity of the turbine generator can easily be changed.

Next, a description will be made on an operation of the thermoacoustic electric generator system 100 with the above configuration on the basis of the above description.

As shown in FIG. 1, in each of the thermoacoustic engines 110, when the one end 111a of the stack 111 is heated by the hot heat exchanger 112, and the other end 111b of the stack 111 is cooled by the cold heat exchanger 113, a temperature difference occurs between the one end 111a as a high-temperature side region and the other end 111b as a low-temperature side region in the stack 111. Due to this temperature difference, the oscillatory wave is primarily generated from the thermoacoustic oscillation of the working gas in each of the stack 111. The acoustic energy E (the vibration energy) of this oscillatory wave (the sound wave) is transferred from the annular tube 102 of the tube component 101 to the turbine 140 through the branched tube 103, and is further transferred to the energy extraction section 160. In this case, the branched tube 103 is configured as a resonance tube (a wave guide tube) for guiding the acoustic energy E of the working gas that is generated in the thermoacoustic engines 110. The acoustic energy E is partially extracted by the turbine 140 as energy extraction means and converted to the electrical energy (the electric energy) by the generator 150, which is connected to said turbine 140, and is also partially extracted by the speaker-type generator of the energy extraction section 160 and converted to the electrical energy (the electric energy).

By the way, in the thermoacoustic electric generator system 100 of the above configuration, mere provision of the turbine 140 in the branched tube 103 does not always allow driving of the generator 150, and in order to reliably drive the generator 150, an installment position of the turbine 140 in the branched tube 103 is extremely important. As a result of the earnest investigation in the installment position of the turbine 140 in the branched tube 103, the present inventor has found an effective turbine installment position for reliable driving of the generator 150 (more specifically, a preferred installment position of the turbine blade 145, which rotates by receiving the acoustic energy, in the turbine 140). A description will hereinafter be made on a measurement method implemented by the present inventor to obtain this finding and a measurement result thereof with reference to FIG. 6 to FIG. 8.

Figure 6:
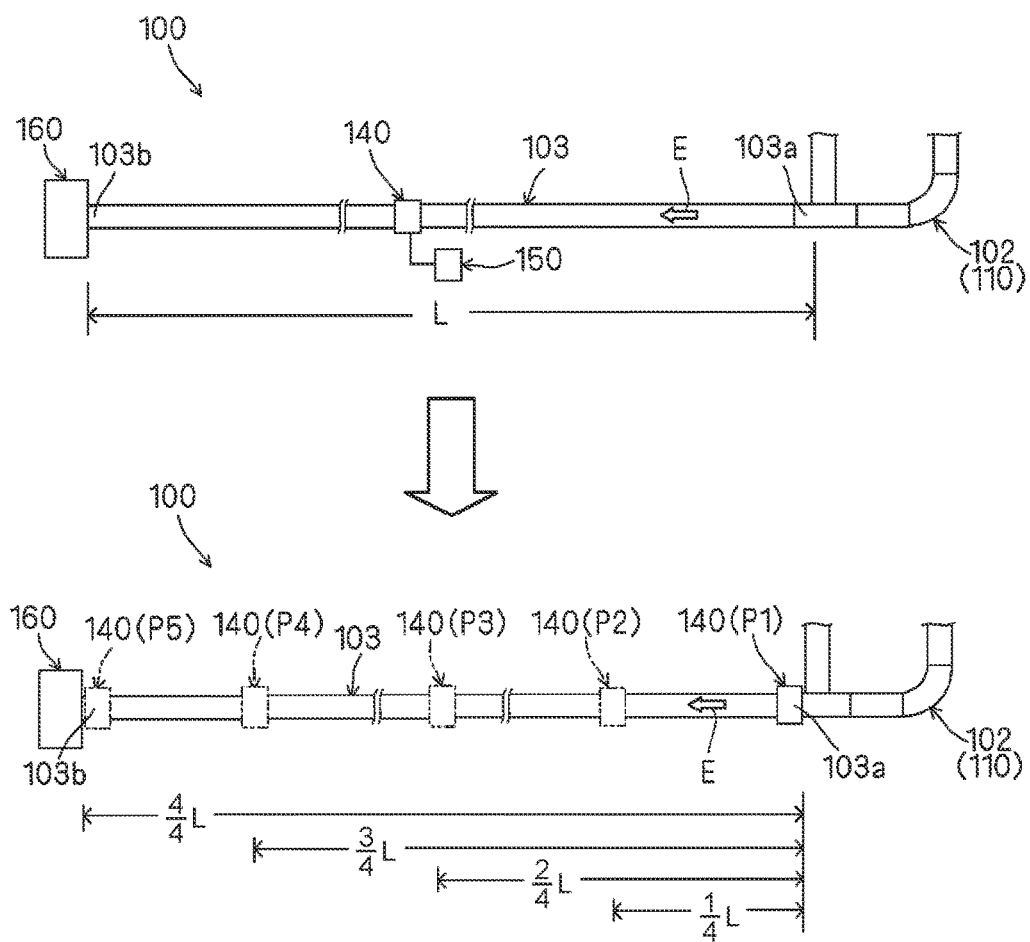
FIG. 6 is a schematic view of a turbine installment position in a branched tube.

As shown in FIG. 6, of each region of the branched tube 103 whose tube length (a distance between the one end 103a to the other end 103b) was L, measurement points, at which measurement to define the preferred installment position of the turbine 140 was made, were respectively set at five positions P1 to P5 as shown in a lower section of the drawing. Note that this FIG. 6 schematically shows a state where the branched tube 103 in FIG. 1 extends linearly. Of each portion of the branched tube 103, the position P1 is a position corresponding to the one end 103a on the annular tube 102 side. Of each of the portions of the branched tube 103, the position P2 is a position that moves from the one end 103a to the other end 103b side by one-fourth of length of the tube length L ((¼)L). Of each of the portions of the branched tube 103, the position P3 is a position that moves from the one end 103a to the other end 103b side by two-fourth of length of the tube length L ((²⁄₄)L). Of each of the portions of the branched tube 103, the position P4 is a position that moves from the one end 103a to the other end 103b side by three-fourth of length of the tube length L ((¾)L). Of each of the portions of the branched tube 103, the position P5 is a position that moves from the one end 103a to the other end 103b side by four-fourth of length of the tube length L ((4/4)L), that is, a position corresponding to the other end 103b.

In first measurement, in a pre-installment state where the turbine 140 was not installed in the branched tube 103, the pressure amplitude and the flow velocity amplitude were measured by a two-sensor method (a method making pressure measurement at two positions) at each of the five positions P1 to P5 in this branched tube 103. The "pressure amplitude" described herein is represented as a magnitude of a pressure fluctuation at a point at a time when the oscillatory wave generated by the thermoacoustic oscillation of the working gas is generated in the inside of the branched tube 103 (fluctuation width between a maximum value and a minimum value of the pressure). In addition, the "flow velocity amplitude" described herein is represented as displacement per unit time of the working gas in the tube longitudinal direction in the inside of the branched tube 103.

Furthermore, in second measurement, a vibration starting temperature of the thermoacoustic engine 110 in a state where the turbine 140 was actually installed at each of the five positions P1 to P5 in the branched tube 103 was measured by a temperature sensor. The "vibration starting temperature" described herein is represented as a temperature at which the thermoacoustic oscillation of the working gas actually starts being induced in the thermoacoustic engine 110 (a minimum value of the temperature at which the thermoacoustic oscillation of the working gas is induced).

Figure 7:
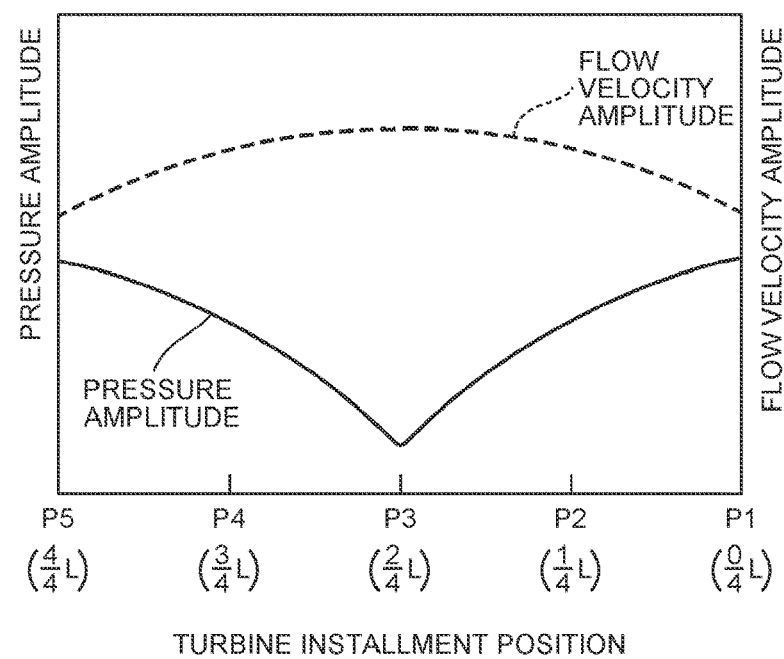
FIG. 7 is a graph of measurement results of pressure amplitude and flow velocity amplitude in the branched tube.

As shown in FIG. 7, the following measurement result (hereinafter, also referred to as a "first measurement result") was obtained; according to the first measurement, while the pressure amplitude became the largest at the position P1 and the position P5 and became the smallest at the position P3, the flow velocity amplitude became the smallest at the position P1 and the position P5 and became the largest at the position P3. In addition, even when an absolute value of the tube length L was changed, a similar tendency to this measurement result, that is, that the pressure amplitude became the smallest and the flow velocity amplitude became the largest at the position P3 was confirmed.

Figure 8:
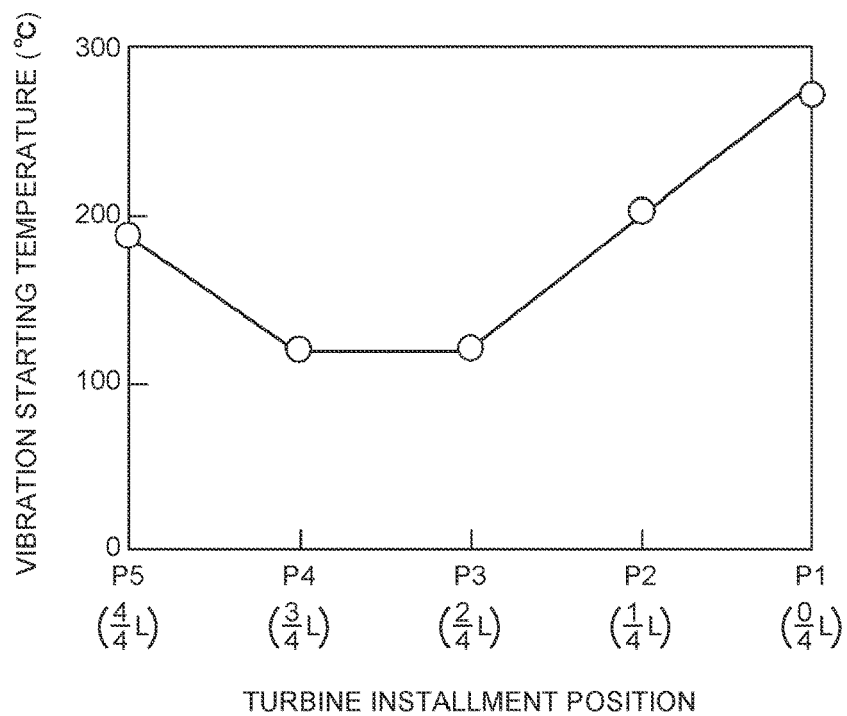
FIG. 8 is a graph of a measurement result of a vibration starting temperature in the branched tube.

As shown in FIG. 8, the following measurement result (hereinafter, also referred to as a "second measurement result") was obtained; according to the second measurement, the vibration starting temperature of the thermoacoustic engine 110 became the highest at 270° C. at the position P1, became the second highest at 200° C. at the position P2, became 190° C. at the position P5, and became the lowest at 120° C. at the position P3 and the position P4. In addition, even when the absolute value of the tube length L was changed, a similar tendency to this measurement result, that is, that the vibration starting temperature became the lowest at the position P3 and the position P4 was confirmed.

In a case based on the first measurement result and the second measurement result as described above, the present inventor determined that a position belonging to a region from the position P3 to the position P4 was the preferred installment position of the turbine 140. When a specific description is made on a basis of this determination, in order to make the turbine blade 145 of the turbine 140 continuously and reliably rotate, a region where the flow velocity amplitude is relatively large (a region from the position P2 to the position P4) is preferred, and, of the region, the position P3, at which the flow velocity amplitude is the largest, is the most advantageous. Meanwhile, in order to actuate the thermoacoustic engine 110 under an energy efficient condition, a region where the vibration starting temperature is the lowest (the region from the position P3 to the position P4) is advantageous. Here, the position P3 is an intermediate position between the one end 103*a* and the other end 103*b* in each of the regions of the branched tube 103 (the position moved from the one end 103*a* to the other end 103*b* side by half the length of the tube length L) and corresponds to the "first position" of the invention. In addition, the position P4 is an intermediate position between the position P3 and the other end 103*b* (the position P5) in each of the regions of the branched tube 103 (the position moved from the position P3 to the other end 103*b* side by one-fourth of length of the tube length L) and corresponds to the "second position" of the invention.

Accordingly, it can be determined that, when the turbine-type generator is used to generate the electric energy, a specified position is preferably defined from the plural positions belonging to the region from the position P3 to the position P4, which is the region where both of the first measurement result and the second measurement result are satisfied, and the turbine 140 is preferably installed at this specified position. When the turbine 140 is installed on the basis of this determination result, the generator 150 can be reliably driven to generate the electric energy, and an energy efficient state can be realized in terms of the generation of the electric energy. Such an approach is effective as a design assist method for the thermoacoustic electric generator system, in which designing thereof is assisted by defining the turbine installment position of the turbine 140 in the branched tube 103.

Furthermore, in a case based on the first measurement result, the other end 103*b* (the position P5) of the branched tube 103, at which the energy extraction section 160 is installed, is the position at which the pressure amplitude of the working gas becomes the largest of each of the regions of the branched tube 103, and, as this energy extraction section 160, use of the speaker-type generator that is actuated by receiving the pressure vibration in the tube longitudinal direction is advantageous. In this way, the acoustic energy E, which cannot fully be collected by the turbine-type generator 150, can be collected as the electrical energy. Note that, as the energy extraction section 160, a known linear generator can be used instead of the speaker-type generator. Also, in a case of using the linear generator, similar to the case of using the speaker-type generator, the electrical energy can be output by receiving the pressure vibration in the tube longitudinal direction of the branched tube 103.

The invention is not only limited to the above typical embodiment, and various applications and modifications thereof can be considered without departing from the purpose of the invention. For example, each of the following embodiments, for which the above embodiment is applied, can also be implemented.

The description has been made on the case where the two heat exchangers (the hot heat exchanger 112 and the cold heat exchanger 113) are provided for the stack 111 in order to generate the specified temperature gradient between the one end 111*a* and the other end 111*b* of the stack 111 in the thermoacoustic engine 110 of the above embodiment. However, as long as the above temperature gradient can be realized in the invention, either one heat exchanger of the hot heat exchanger 112 and the cold heat exchanger 113 can be removed.

In the above embodiment, the description has been made on the case where the generator 150 is installed on the outside of the branched tube 103. However, the invention can also adopt a structure in which the generator 150 is installed with the turbine 140 in the inside of the branched tube 103 when necessary.

In the above embodiment, the description has been made on the case where the energy extraction section 160 is installed at the other end 103*b* of the branched tube 103. However, in the invention, instead of this energy extraction section 160, a vibration absorbing material (sponge, urethane, or the like) that can absorb the vibration of the working gas may be installed.

In a case based on the above embodiment or any of various modified examples, the invention can adopt the following aspects.

The invention can adopt an aspect of a design assist method of a thermoacoustic electric generator system including:

"a tube component that is configured by including: an annular tube configured to be annular; and a branched tube branched from the annular tube, extending lengthwise from one end, which is located at a branched point from the annular tube, to the other end, and communicating with the annular tube and, in which specified working gas is enclosed in both of the annular tube and the branched tube;

a thermoacoustic engine that includes: a stack incorporated in an inside of the annular tube in the tube component and having plural channels, each of which extends in a tube longitudinal direction; and a heat exchanger exchanging heat with the working gas such that a temperature gradient is generated between both ends of each of the plural channels in the stack, so as to cause thermoacoustic oscillation of the working gas;

a turbine provided in the branched tube of the tube component and rotating when receiving acoustic energy, which is generated by thermoacoustic oscillation of the working gas in the thermoacoustic engines; and a generator for converting kinetic energy generated by rotation of the turbine to electric energy, the design assist method assisting designing thereof by defining a turbine installment position of the turbine in the branched tube of the tube component, in which in a pre-installment state of the turbine, flow velocity amplitude as displacement per unit time of the working gas in a tube longitudinal direction in an inside of the branched tube is measured, and a region where the measured flow velocity amplitude is relatively large in each region of the branched tube is defined as the turbine installment position."

REFERENCE SINGS LIST

100/THERMOACOUSTIC ELECTRIC GENERATOR SYSTEM
101/TUBE COMPONENT
102/ANNULAR TUBE
103/BRANCHED TUBE
103a/ONE END
103b/THE OTHER END
110/THERMOACOUSTIC ENGINE
111/STACK
112/HOT HEAT EXCHANGER
113/COLD HEAT EXCHANGER
120/HEATING SOURCE
130/COOLING SOURCE
140/TURBINE
141/TURBINE HOUSING
144/TURBINE ROTATIONAL SHAFT
145/TURBINE BLADE
146/ROTOR BLADE SECTION
147/FIXED BLADE SECTION
148/CONE SECTION (INTRODUCTORY SECTION)
150/GENERATOR
151/GENERATOR HOUSING
156/ELECTRIC MOTOR
160/ENERGY EXTRACTION SECTION

What is claimed is:

1. A thermoacoustic electric generator system comprising:
a tube component that is configured by including: an annular tube configured to be annular; and a branched tube branched from the annular tube, extending lengthwise from one end, which is located at a branched point from the annular tube, to the other end, and communicating with the annular tube and, in which specified working gas is enclosed in both of the annular tube and the branched tube;
a thermoacoustic engine that includes: a stack incorporated in an inside of the annular tube in the tube component and having plural channels, each of which extends in a tube longitudinal direction; and a heat exchanger exchanging heat with the working gas such that a temperature gradient is generated between both ends of each of the plural channels in the stack, so as to cause thermoacoustic oscillation of the working gas;
a turbine provided in the branched tube of the tube component and rotating when receiving acoustic energy, which is generated by thermoacoustic oscillation of the working gas in the thermoacoustic engines; and
a generator converting kinetic energy generated by rotation of the turbine to electric energy, wherein
the turbine is provided at a specified position that belongs to a region between a first position and a second position in each region of the branched tube in the tube component, the first position being an intermediate position between the one end and the other end, and the second position being an intermediate position between the first position and the other end.

2. The thermoacoustic electric generator system according to claim 1, wherein
at the other end, the branched tube of the tube component includes an energy extraction section extracting the acoustic energy, which is generated by the thermoacoustic oscillation of the working gas, to an outside thereof, and the energy extraction section is constructed of a speaker-type generator or a linear generator capable of outputting electrical energy when receiving pressure vibration in a tube longitudinal direction of the branched tube.

* * * * *